United States Patent [19]

Moss et al.

[11] 4,045,649
[45] Aug. 30, 1977

[54] HOLDER FOR CARBON ARC ELECTRODES

[75] Inventors: Paul B. Moss, Tulsa; Gilbert L. Watson, Locust Grove, both of Okla.

[73] Assignee: Paul B. Moss, Tulsa, Okla.

[21] Appl. No.: 609,705

[22] Filed: Sept. 2, 1975

[51] Int. Cl.² .............................................. B23K 9/28
[52] U.S. Cl. ................................. 219/143; 219/144; 339/73
[58] Field of Search ....... 24/136 R, 263 SW, 263 SB; 403/374, 368; 339/73 S; 219/143, 144, 138; 174/79, 94 S

[56] References Cited

U.S. PATENT DOCUMENTS

| 2,068,368 | 1/1937 | Bovier | 174/79 X |
| 2,220,203 | 11/1940 | Branin | 24/136 R |
| 2,416,859 | 3/1947 | Vining | 24/136 R X |

FOREIGN PATENT DOCUMENTS

| 910,776 | 6/1946 | France | 174/94 S |

*Primary Examiner*—E. A. Goldberg
*Attorney, Agent, or Firm*—Head, Johnson & Chafin

[57] ABSTRACT

A holder for a carbon arc electrode: the holder having an elongated body with an opening therethrough in which the electrode is positioned, the body having a slot in the lower end thereof communicating with the opening, the opening being defined in cross-section such that the portion adjacent the slot provides opposed uniplanar ledges to either side of the slot, the plane of the ledges being tapered relative to the axis of the opening through the body; a slide block of length less than the body, the slide block being configured to be slidably positioned in the opening in the body, the bottom of the slide block being an engagement with the ledges, slide block having an electrode engaging upper surface which has a taper of the same angle as the taper of the ledges, the taper being oppositely inclined to that of the ledges so that the electrode engaging surface is parallel to the axis of the opening through the body so that the electrode is contacted by increased pressure as the slide block moves forwardly in the opening in the body; and spring means between the body and the slide block for resiliently urging the slide block towards the forward end of the body to maintain contact pressure on an electrode positioned in the opening in the body.

6 Claims, 6 Drawing Figures

U.S. Patent   Aug. 30, 1977   4,045,649
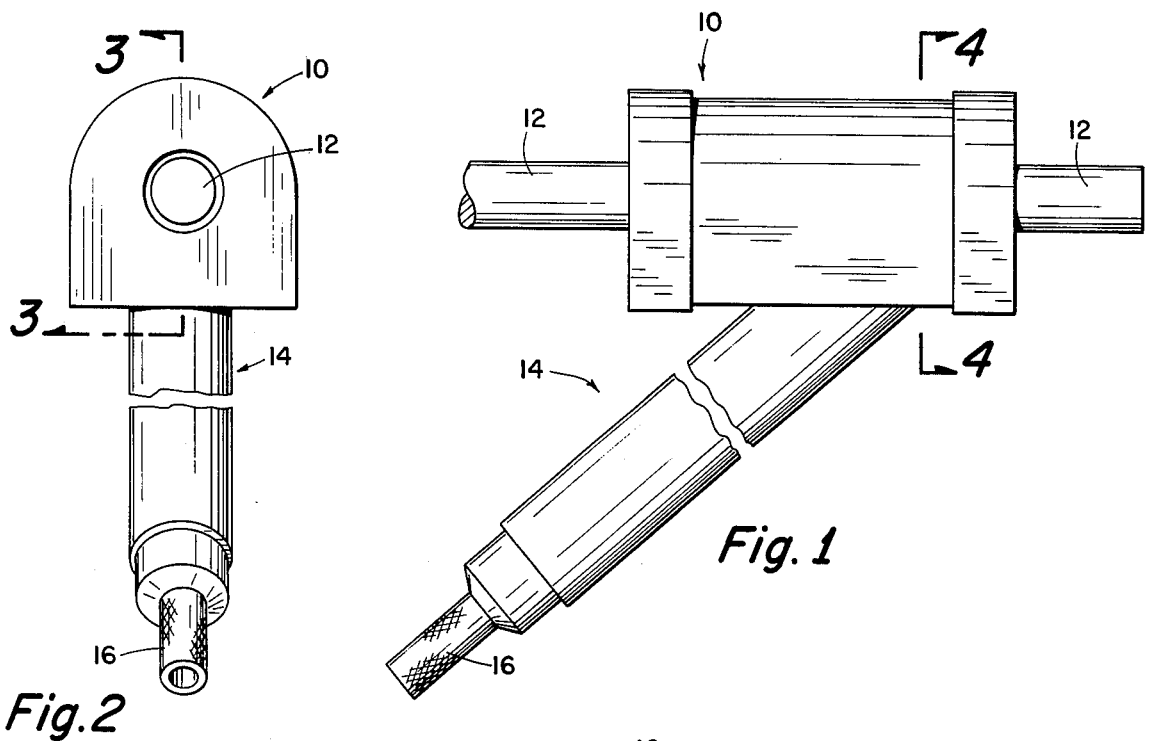
Fig. 1
Fig. 2
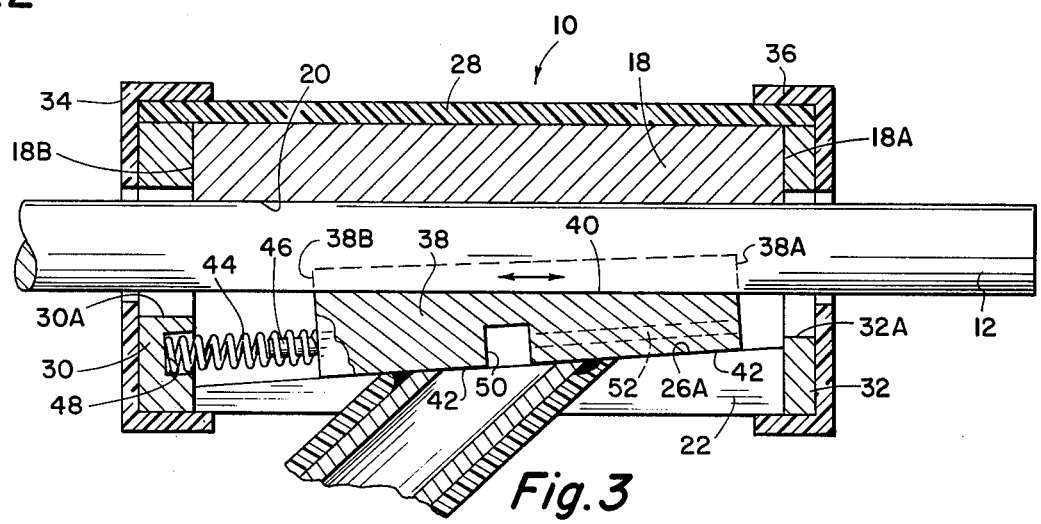
Fig. 3
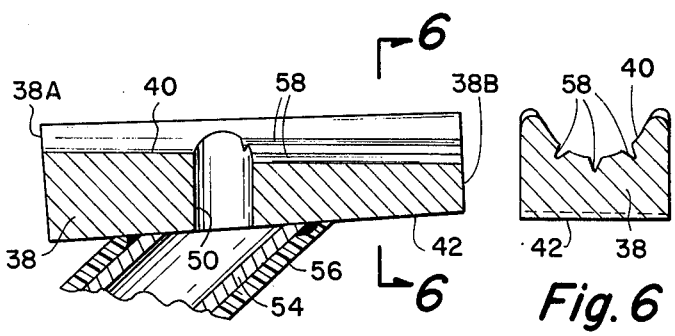
Fig. 5
Fig. 6
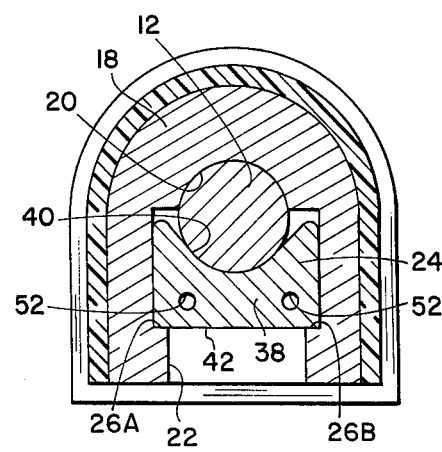
Fig. 4

HOLDER FOR CARBON ARC ELECTRODES

BACKGROUND AND OBJECTS OF THE INVENTION

A technique for cutting metal which has been used for some time is that of imposing a low voltage high current source between the work to be cut and a carbon electrode. The electric arc formed between the electrode and the work piece creates an area of high heat intensity which melts a localized area of the work piece. To remove the molten metal formed in the localized area an air stream is directed to blow it away.

In order to effectively accomplish cutting of metal using this technique a holder is required to perform the plural function of holding the carbon arc electrode in a way so that the extension of the electrode from the holder can be easily adjusted, plus providing a means of maintaining low resistance electrical connection with the electrode, and at the same time providing a means of directing air along the electrode to blow away molten metal formed in the cutting process.

Towards this goal others have devised electrode holders, an example is that of U.S. Pat. No. 2,935,597. One problem with the known type of holders, including that taught in this previously issued patent, is that it is necessary to make good electrical contact between the holder and the electrode while at the same time providing an easy means of adjusting the length of the electrode relative to the holder. The arc formed by the electrode with the molten metal gradually eats away the carbon electrode so that it must be periodically extended relative to the holder. For these reasons, the common means of using carbon arc electrodes is to utilize a holder which provides for adjusting the length of the electrode extension from the holder. Because of the high currents involved in the apparatus, any resistance caused by the contact causes high temperatures to develop and any imperfection in the contact between the holder and the electrode results in arcing. The arcing not only reduces the life of the electrode but generates substantial amount of additional heat. For this reason, it is highly important that a minimum of electrical resistance exists between the holder and the electrode, while at the same time providing means of easily moving the electrode relative to the holder.

It is therefore an object of this invention to provide an improved holder for carbon arc electrodes. More particularly, an object of this invention is to provide an improved holder for carbon arc electrodes including improved means of achieving and maintaining effective electrical connections between the holder and the electrode.

Still more particularly, an object of this invention is to provide a holder for carbon arc electrodes including means of providing improved electrical contact between the holder and the electrode and in addition, providing means whereby the adjustment of the electrode relative to the holder is easily and expeditiously accomplished by the user.

Another object of the invention is to provide a holder for carbon arc electrode utilizing a flow of air to blow the molten metal away from the area being cut, including improved means of directing the flow of air along the electrode.

These general objects, as well as other and more specific objects of the invention, will be fulfilled in the following description and claims, taken in conjunction with the attached drawing.

DESCRIPTION OF THE VIEWS

FIG. 1 is an elevational side view of an embodiment of the carbon arc electrode holder of this invention.

FIG. 2 is an end view of the rearward end of the holder of FIG. 1.

FIG. 3 is a cross-sectional view of the holder taken along the line 3—3 of FIG. 2, showing the internal arrangement of the holder.

FIG. 4 is a cross-sectional view of the holder taken along the line 4—4 of FIG. 1.

FIG. 5 is a cross-sectional view of the sliding block element of the invention showing alternate arrangement for directing a stream of air along the carbon arc electrode.

FIG. 6 is a cross-sectional view of the alternate arrangement taken along the lines 6—6 of FIG. 5.

SUMMARY OF THE INVENTION

The holder for carbon arc electrodes described herein is devised for directing a carbon arc electrode onto a piece of metal to be cut, a high current source being connected between the piece to be cut and the holder so as to create an arc between the electrode and the work piece to melt a localized portion of the work piece. Air is directed from the holder along the electrode to blow the molten metal away, thereby forming a cut in the work piece.

The holder includes a body having an axial opening therethrough which receives the electrode. The body has a slot in the lower portion communicating with the opening and the opening and slot together form, cross-section, an arrangement having internal ledges in the lower portion of the body adjacent to slot, the plane of the ledges being tapered toward the axis of the opening through the body, the tapering being towards the front of the body. Slidably positioned in the lower portion of the opening, and in engagement with the ledges, is a slide block. The slide block has an upper portion configured to engage the electrode place in the body and this surface is tapered at the same degree as the taper of the ledges of the body, but in reversed direction, so that the electrode engaging surface of the slide block is parallel to the electrode engaging surface of the body. The spacing between these two surfaces varies and is reduced as the slide block moves towards the forward end of the body. A spring resiliently urges the slide block toward the forward end of the body so that an electrode received in the body is contacted by the body and the slide block in firm engagement. The operator can adjust the position of the electrode by moving the slide block rearwardly, thereby removing the contact pressure on the electrode and allowing the electrode to be positioned so that the length of the electrode extending in front of the body is easily adjustable. Means are provided for directing a stream of air through the slide block and along the exterior of the electrode and such means includes an alternate arrangement wherein the air passes through grooves in the electrode contacting surface of the slide body.

DETAILED DESCRIPTION

Referring to the drawings and first to FIGS. 1 and 2, the holder includes a main portion generally indicated by numeral 10, which receives a carbon arc electrode 12, therethrough. The carbon arc electrode 12 is usually made of carbon with a thin copper covering to increase electrical conductivity of the electrode, the copper covering being burned away by the arcing at the contact with the work piece being cut.

Extending from the main portion is a handle portion 14, and at the lower end of the handle is a connector 16, by which electrical connection may be made with a flexible conductor. The connector 16 also preferably includes means of conducting compressed air to the holder.

Referring to FIG. 3, the details of the invention are better shown. The main portion 10 includes a body 18 which is elongated and has a forward end 18A and a rearward end 18B. The body 18 is preferably made of a conducting material, such as copper or copper alloy. An opening 20 extends through the body. The upper portion of the opening 20 is configured to engage the electrode 12 and preferably is of arcuate having the diameter of the exterior of the electrode 12 to which the holder is dimensioned so as to provide maximum electrical contact with the electrode. In the lower end of the body 18 is a slot 22 (See FIG. 4) which communicates from the exterior of the body to the opening 20. The lower portion of the opening 20 is of rectangular cross-sectional configuration, at 24, and provides opposed ledges 26A and 26B. The ledges are adjacent to slot 22 and are in a common plane which extends at an angle relative to the axis of the opening 20, or more precisely, at an angle relative to the upper electrode contact surface formed by the opening 20.

The body 18 is preferably covered with an insulation 28. At the rearward end of the body 18 is an end plate 30 having an opening 30A at least equal to the diameter of the opening 20 through the body 18. In like manner, a forward end plate 32 is affixed to the forward end of the body 18 and has an opening 32A therein. The end plates 30 and 32 serve to close slot 22. Insulation caps 34 and 36 are positioned over the forward end and rearward end, respectively, of the body to complete the insulation of the holder main portion 10.

Slidably positioned within the body recess 20, in the lower rectangular portion 24A thereof, is a slide block 38. In cross-section, as shown in FIG. 4, the slide block is preferably rectangular and is slidably received in the rectangular portion 24 of the opening through the body and slides upon ledges 26A and 26B. The slide body has an upper electrode contacting surface 40 which is preferably semi-circular to engage a portion of the surface of the electrode 12 to which the tool is dimensioned, so as to provide maximum electrical continuity with the electrode. The electrode contacting surface 40 is inclined at an angle relative to the bottom surface 42 of the slide block, angle being the same as the angle of inclination of the plane of the ledges 26A and 26B, but in the opposite direction. In this way the spacing between the contacting surface 40 of the slide block and the contacting surface 20 of the body is variable, decreasing as the slide block 18 moves toward the body forward end 18A.

A spring means 44 is provided to urge the slide block 38 in a forward direction. One method of accomplishing this is illustrated in FIG. 3 and includes a pin 46 extending from the rearward end of the slide block around which one end of the spring 44 is positioned. A recess 48 in the rearward end plate 30 receives the other end of the spring so that it is retained in position and yet always urges the slide block in the forward direction.

A cavity is formed in the intermediate lower end of the slide block communicating with the bottom surface 42. Extending between the cavity 50 and the forward end 38A of the slide block are two small diameter openings 52 (See FIGS. 3 and 4).

Attached to the slide block 38 is a current and air conducting member 54 which is hollow or tubular, and communicates with the cavity 50. The member 54 is covered by insulation 56 and preferably extends at rearward angle relative to the slide block member as shown in FIGS. 1 and 3 so that it serves as a handle by which the user holds the rod holder.

At the lower end of the current and air conducting member 14 is the connecting portion 16, as shown in FIG. 1, by which electrical current and air pressure is connected to the holder.

When the user desires to insert an electrode 12 into the holder, or to move an electrode which is already in the holder forward, he pushes the body member 18 forward relative to the handle portion 14 and thereby, forward relative to the slide block 38. This increases the spacing between the slide block contacting surface 40 and the body contacting surface 20 allowing the electrode to be inserted or positioned. When pressure is removed, spring 44 automatically pushes the slide block forward relative to the body to maintain contact pressure on the electrode 12. Air pressure introduced through the current and air conducting member 44 flows through the cavity 50 and through the small diameter opening 52 to be discharged along the lower periphery of the electrode. FIGS. 5 and 6 show an alternate embodiment of the means of discharging air along the electrode. Rather than the small diameter openings 52 of FIGS. 3 and 4, grooves 58 are formed in the electrode connecting surface 40. The grooves 58 extend from cavity 50 to the slide block forward end 38B. Air pressure introduced through cavity 50 flows through grooves 58 and is discharged around the lower periphery of the electrode.

FIG. 6 shows the use of three grooves 58, although it can be seen that one, two or more may be employed. Introducing the flow of air along the surface of the electrodes in grooves 58 serves to cool the electrode and the holder, prolonging the life of both.

Some holders for electrodes for arc cutting are equipped with means for circulating water through the holder to cool it, in addition to the provision of current conducting facility to the electrode and the discharge of air to blow the molten metal away, and it can be seen that water cooling can be employed with the principles of the present invention without departing from the concept herein disclosed.

The actual physical appearance of holders employing the principles of this invention may vary considerably. The shape of the components may be varied to improve appearance, or the ease of use, all within keeping with the principles of the invention. It is understood that the invention is not to be limited to the embodiments set forth herein for purposes of exemplification, but is to be limited only by the scope of the attached claim or claims, including the full range of equivalency to which each element or step thereof is e..titled.

We claim:

1. A holder for a cylindrical carbon arc electrode, comprising:
    an elongated body having a forward end and a rearward end, having an opening therethrough from the forward to the rearward end, and a slot in the bottom side communicating with the opening, the opening being configured in cross-section perpendicular the length of the body to provide an electrode engaging portion opposite said slot, and a slide block receiving portion spaced between said electrode receiving portion and said slot, the slide block receiving portion having opposed ledges to either side of said slot, the ledges being in a common plane tapering from one end of the body to the other;

an elongated slide block of electrically conducting material of length less than said body having a forward end and a rearward end, the slide block being slidably receivable in said body opening, the bottom thereof being in engagement with said ledges, the slide block having an electrode engaging upper surface having a lengthwise taper of the same angle as the taper of said ledges, the slide block being positioned in said body such that the electrode engaging surface is parallel with the electrode engaging portion of said body opening and such that the spacing therebetween varies according to the position of the slide block member;

spring means resiliently urging the slide block in the direction to reduce the spacing between said slide block electrode engaging surface and said body electrode engaging surface whereby an electrode positioned therebetween is securely retained; and a current conducting member affixed to said slide block by which electrical conductivity can be had to an electrode received in said body.

2. A holder for a carbon arc electrode according to claim 1 wherein said slide block has at least one small diameter opening therein from an intermediate area to said forward end, and including:

a hollow current and air conducting member affixed to said slide block intermediate the length thereof and having communication with said opening therein, whereby air introduced through said current and air conducting member flows through said slide block small diameter open and is discharged along the length of an electrode received in the holder.

3. A holder for a carbon arc electrode according to claim 1 wherein said slide block has at least one groove in said electrode engaging upper surface extending from an intermediate portion of said slide block to said forward end, and including:

a hollow current and air conducting member affixed to said slide block intermediate the length thereof and having communication with said groove therein, whereby air introduced through said current and air conducting member flows through said groove in said slide block and is discharged along the length of an electrode received in the holder.

4. A holder for a carbon arc electrode according to claim 1 wherein said electrode engaging portion of said opening through said body and said electrode engaging portion of said slide block are each semi-circular configured to engage and conform to portions of the cylindrical surface of an electrode.

5. A holder for a carbon arc electrode according to claim 1 in which body is formed of electrically conductive material and including an exterior covering of all portions except said slot by an insulated material.

6. A holder for a carbon arc electrode according to claim 1 including:

a hollow current and air conducting member affixed to said slide block intermediate the length thereof, the conducting member extending through said slot in said body, the conducting member extending at an angle to said slide block and in the direction toward said rearward end of said body, the hollow current and air conducting member providing a handle for the holder.

* * * * *